United States Patent
Mues et al.

(10) Patent No.: US 8,734,893 B2
(45) Date of Patent: *May 27, 2014

(54) PROCESS FOR PRODUCING AN ION-PERMEABLE WEB-REINFORCED SEPARATOR

(75) Inventors: Willem Mues, Tremelo (BE); Bart Cobben, Reet (BE); Wim Doyen, Wommelgem (BE)

(73) Assignees: Agfa-Gevaert N.V., Mortsel (BE); Vito N.V., Mol (BE)

( * ) Notice: Subject to any disclaimer, the term of this patent is extended or adjusted under 35 U.S.C. 154(b) by 527 days.

This patent is subject to a terminal disclaimer.

(21) Appl. No.: 12/990,920

(22) PCT Filed: May 29, 2009

(86) PCT No.: PCT/EP2009/056604
§ 371 (c)(1),
(2), (4) Date: Jan. 24, 2011

(87) PCT Pub. No.: WO2009/147086
PCT Pub. Date: Dec. 10, 2009

(65) Prior Publication Data
US 2011/0111122 A1 May 12, 2011

Related U.S. Application Data

(60) Provisional application No. 61/058,052, filed on Jun. 2, 2008.

(30) Foreign Application Priority Data

Jun. 2, 2008 (EP) ..................................... 08104212

(51) Int. Cl.
*B05D 5/12* (2006.01)
*B05D 1/26* (2006.01)

(52) U.S. Cl.
USPC ............ 427/115; 427/209; 427/355; 427/356

(58) Field of Classification Search
USPC .................................. 427/115, 209, 355, 356
See application file for complete search history.

(56) References Cited

U.S. PATENT DOCUMENTS

| 4,063,531 A | 12/1977 | Zitzow |
| 4,231,318 A | 11/1980 | Zink |

(Continued)

FOREIGN PATENT DOCUMENTS

| EP | 0 232 923 B1 | 7/1992 |
| EP | 0 926 749 A2 | 6/1999 |

(Continued)

OTHER PUBLICATIONS

International Search Report issued in International Patent Application No. PCT/EP2009/056604, mailed on Sep. 25, 2009.

(Continued)

*Primary Examiner* — Brian K Talbot
(74) *Attorney, Agent, or Firm* — Leydig, Voit & Mayer, Ltd.

(57) ABSTRACT

A process comprising a duplex type impregnating apparatus providing the steps of: (i) providing an elongated porous web, said elongated porous web comprising two outermost surfaces; (ii) transporting said elongated porous web downwards between two impregnating heads comprising two slots each with substantially vertical upper and lower slot faces substantially parallel to said elongated porous web providing simultaneously to both surfaces of said elongated porous web metered substantially identical quantities of a dope, comprising at least one membrane polymer and at least one solvent therefor; (iii) thereby impregnating said elongated porous web completely with said dope and providing substantially equally thick dope layers on each surface of said outermost surfaces of said elongated porous web with a thickness independent of the gap between one of said lower slot faces and the surface of said elongated porous web nearest thereto; (iv) subjecting said dope associated with said elongated porous web to symmetric phase inversion with at least one non-solvent thereby forming a membrane, and (v) removing residues of said at least one solvent for said at least one membrane.

12 Claims, 2 Drawing Sheets

(56) References Cited

U.S. PATENT DOCUMENTS

| | | |
|---|---|---|
| 5,650,011 A | 7/1997 | Yoshinaga |
| 5,776,251 A | 7/1998 | Irie et al. |
| 5,882,407 A | 3/1999 | Takeno et al. |
| 6,174,372 B1 | 1/2001 | Yoshinaga et al. |
| 7,029,532 B2 | 4/2006 | Kurkinen et al. |
| 8,496,989 B2 * | 7/2013 | Mues et al. .................. 427/115 |
| 2001/0017280 A1 | 8/2001 | Meyering et al. |

FOREIGN PATENT DOCUMENTS

| | | | |
|---|---|---|---|
| EP | 1 298 740 A2 | | 4/2003 |
| EP | 1298740 | * | 4/2003 |
| EP | 1 626 109 A1 | | 2/2006 |
| EP | 1 191 622 B1 | | 1/2011 |
| GB | 1 270 133 A | | 4/1972 |
| JP | 10-064503 A | | 3/1998 |
| WO | WO 93-15529 A1 | | 8/1993 |
| WO | WO 2006-015462 A2 | | 2/2006 |

OTHER PUBLICATIONS

International Preliminary Report on Patentability in corresponding International Patent Application No. PCT/EP2009/056604, mailed Dec. 6, 2010.

\* cited by examiner

PROCESS FOR PRODUCING AN ION-PERMEABLE WEB-REINFORCED SEPARATOR

FIELD OF THE INVENTION

The present invention is related to an ion-permeable web-reinforced separator for use in electrochemical applications.

BACKGROUND OF THE INVENTION

Chrysotile asbestos has long been used as the separator material for alkaline water electrolysis. However, for known health risk reasons and quality fall-off of the asbestos raw materials, asbestos separators are being abandoned. However, suitable alternatives are very scarce and still exhibit some drawbacks mainly related to their chemical stability in strong alkaline medium at high temperature (above 80° C.), and to their limited wettability.

Two approaches have been followed to realize ion-permeable diaphragms, both relying upon phase inversion of a binder-containing dope to provide the necessary porosity.

GB 1 270 133A discloses a method of applying liquid coating compositions simultaneously to both surfaces of a travelling web of indefinite length wherein the web is passed continuously between two opposed extrusion/doctor coating devices each having at least one doctor surface and at least one coating composition is fed continuously at constant pressure to each doctor surface to form at least one coating by passage between the surface of the web or a coating thereon and the respective doctor surface, the liquid supply pressures of the said coating compositions being so balanced that the web is maintained in a stable position intermediate the opposed doctor surfaces.

U.S. Pat. No. 5,650,011 discloses a duplex type coating apparatus for applying a coating liquid to a web, such as an elongated fabric, a plastic sheet and a metal sheet, comprising: a pair of dies arranged at opposite sides of a path of travel of the web while said web moves at a specified rate: a pair of coating liquid reservoirs defined within respective ones of said pair of dies; said pair of dies each having one of a pair of discharge ports placed on opposite sides of the path of travel of the web along a width thereof and for discharging said coating liquid from said pair of liquid reservoirs onto said web; and coating liquid supply means for supplying said coating liquid to said pair of liquid reservoirs at a specific supply amount per unit time based upon a rate of travel of the web multiplied by a preset coat thickness and a preset coat width to simultaneously apply substantially the same amount of said coating liquid to said opposite sides of the web through said pair of discharge ports to deposit the coating liquid on said web at said preset coat thickness and said preset coat width.

U.S. Pat. No. 5,776,251 discloses a duplex type coating apparatus for applying a coating liquid to a web, such as a long web made of cloth, plastic film, metal sheet, mesh-form metal sheet and porous metal sheet, comprising: a pair of dies disposed on opposite sides of a carrying path of said web; each of said dies having a liquid reservoir for holding said coating liquid; each of said dies having a tip portion with a discharge port extending in a widthwise direction of the web for discharging said coating liquid onto opposite sides of said web; each of said dies having a coating liquid discharge passage extending from the liquid reservoir to the discharge port; coating liquid supplying means for supplying coating liquid to the liquid reservoirs such that the duplex type coating apparatus applies said coating liquid to both sides of said web by discharging same amounts of said coating liquid from each of said discharge ports onto the web; said discharge ports being disposed opposite one another and each having a web entry side edge part and a web exit side edge part; said web entry side edge parts projecting further toward said web than said web exit side edge parts such that the web exit side edge parts define an exit gap therebetween, the web entry side edge parts define an entry gap therebetween and said exit gap is wider than said entry gap so that the coating liquid is prevented from leaking from between said discharge ports; and the web exit side edge parts each having a curved surface extending from the coating liquid discharge passage to the tip part of each of the dies so that a coating pressure of the coating liquid discharged from the discharge passages increases from a lower level adjacent said web entry side edge parts to a higher level adjacent the web exit side edge parts.

U.S. Pat. No. 6,174,372 discloses a coating apparatus for coating opposing sides of a web, such as an elongated web of cloth, plastic film, metal sheet, glass plate, metal sheet in a net-like shape and a porous metal sheet, traveling in a traveling direction along a transfer paths with a coating solution, comprising: dies installed on opposing sides of said transfer path; said dies each including a reservoir for storing the coating solution inside respective ones of said dies; said dies each having an ejection port with an elongated width along a width direction of the web for ejecting the coating solution; ejection paths for the coating solution communicating substantially the elongated width of the ejection ports with respective ones of said reservoirs; coating solution supplying means for supplying a controlled amount of the coating solution to said reservoirs to effect ejection of the coating solution onto opposing sides of the web by ejecting the coating solution respectively from said ejection ports onto the web; each of said ejection paths having a rotary valve with a rotatable valve element of a substantially cylindrical shape extending parallel to and along a width of the elongated width of the ejection ports which opens said ejection path when positioned within a first angular range and closes said ejection path when positioned within a second angular range; and driving means for pivoting said rotatable valve elements of the rotary valves between said first angular range and said second angular range to provide intermittent flow of said coating solution to apply an intermittent coating to said web.

EP 1 191 622A1 discloses a lithium ion secondary battery separator comprising a sheet (A) with an average film thickness of 10-35 μm, a basis weight of 6-20 g/m$^2$, a gas permeability (JIS P8117) of no longer than 100 seconds, a MacMullin number of 10 or smaller at 25° C. and a MacMullin number×average film thickness value of no greater than 200 μm. EP 1 191 622A1 further discloses that the sheet is composed of fibers and the average diameter of the fibers composing the sheet is ½ to ¹⁄₁₀ of the average film thickness of the sheet (A), wherein the sheet (A) is preferably composed of a polyester, aromatic polyamide, polyphenylene sulfide or polyolefin or a combination of two or more thereof. EP 1 191 622A1 also discloses that the sheet (A) is preferably a nonwoven fabric and that the porous film may also contain a porous inorganic filler if necessary, in addition to the sheet (A) and porous organic polymer film (B).

EP 1 191 622A1 also discloses that the separator preferably comprises a porous film with an average film thickness of 10-35 μm and a basis weight of 10-25 g/m$^2$, which contains a porous organic polymer film (B) that surrounds a sheet (A), and is swelled with the electrolyte solution and retains it. EP 1 191 622A1 discloses that the porous film can be obtained by impregnating and coating the sheet (A) into a solution of the polymer used to form the porous organic polymer film (B), and then removing the solvent. The following methods may be mentioned as specific methods for fabrication of the porous film: 1) a method in which a polymer used to form the porous organic polymer film (B), a solvent which dissolves it and is compatible with water, and a phase separating agent (gelling agent or pore forming agent) are mixed and dissolved together, the sheet (A) is impregnated and coated with the dope solution, and the resulting film is then immersed in an aqueous coagulation bath to coagulate the polymer used to form the porous organic polymer film (B), and finally washed and dried to obtain a porous film; 2) a method in which a polymer used to form the porous organic polymer film (B), a volatile solvent which dissolves it and a plasticizing agent are mixed and dissolved together and the sheet (A) is impregnated and coated with the dope solution and then dried to remove the volatile solvent, after which the plasticizing agent is dissolved and then extracted with a volatile solvent that does not dissolve the polymer used to form the porous organic polymer film (B), and drying is carried out to obtain a porous film; and 3) a method in which a polymer used to form the support having a narrow clearance between the support and the die lip conveying exit ends of the support conveying exit lips from the die discharge section, and with the dope supplied in a quantitative manner in the widthwise direction accumulates in a liquid pool space formed by positioning opposite the support, allowing continuous impregnation and dispensing of the dope into the support. In this system, the thickness of the coated film can be controlled by changing the clearance between the support and the die lip conveying exit ends at the tips of the lips at the support exit end. This is clearly a process in which the wet layer thickness is determined by the clearance between the support and the die lip. The "air gap step" disclosed in EP 1 298 740A is a step in which the coating apparatus, for example the dispensing/smoothing jig or the die lip, and the coagulating bath are not directly in contact, one is of the purposes of which being to provide a leveling effect and hence to realize uniform coating of the dope on both sides of the porous support. The dope compositions, none of which contains a pigment, and coagulating solutions exemplified in EP 1 298 740A are summarized in the Table below:

| Example nr | wt % in PVdF copolymer | | | | | concentration | solvent mixture (parts by wt) | | | | coagulating solution (parts by wt) | | | | |
|---|---|---|---|---|---|---|---|---|---|---|---|---|---|---|---|
| | VDF | HFP | CTFE | PFVE | Mw | [wt %] | DMAC | TPG | BD | PPG-400 | H$_2$O | DMAC | TPG | BD | PPG-400 |
| 1 | 92.0 | 4.5 | 3.5 | — | $4.1 \times 10^5$ | 12 | 6 | 4 | — | — | 5 | 3 | 2 | — | — |
| 5 | 89.5 | 8.8 | 1.7 | — | $6.8 \times 10^5$ | 15 | 7 | — | 3 | — | 6 | 2.4 | — | 1.6 | — |
| 6 | 88.7 | 4.4 | 6.9 | — | $5.3 \times 10^5$ | 13.5 | 6 | — | — | 4 | 6 | 2 | — | — | 2 |
| 7 | 91.3 | — | 3.5 | 5.2 | $1.0 \times 10^6$ | 15 | 5 | — | — | 5 | 6 | 2 | — | — | 2 |
| 8 | 88.7 | 4.4 | 6.9 | — | $5.3 \times 10^5$ | 8 | 6 | — | — | 4 | 6 | 2 | — | — | 2 |
| 9 | 92.0 | 4.5 | 3.5 | — | $4.1 \times 10^5$ | 15 | 10 | — | — | — | 6 | 2.4 | — | 1.6 | — |

PFVE = perfluorovinyl ether
TPG = tripropylene glycol
BD = 1,3-butanediol porous organic polymer film (B) is mixed with a plasticizing agent, the mixture is heated to plasticize and melt the polymer used to form the porous organic polymer film (B) and the sheet (A) is impregnated and coated with this dope, after which the film is cooled to hardness, the plasticizer is dissolved and then extracted with a volatile solvent that does not dissolve the polymer used to form the porous organic polymer film (B), and drying is carried out to obtain a porous film.

EP 1 298 740A discloses a process for production of a composite porous film composed of an organic polymer compound surrounding a porous support, which process comprises coating both sides of a porous support with a solution (dope) of an organic polymer compound and a water-soluble organic solvent using a coating apparatus, subsequently subjecting it to an air gap step and conveying the coated porous support into a coagulating bath containing a coagulating solution consisting of water or a mixture of water with the same solvent as said organic solvent, immersing said porous support in said coagulating bath so that the coated film on both surfaces of said coated porous support contacts directly with the coagulating bath for coagulation, and then washing and drying it. EP 1 298 740A further discloses coating the dope on both sides of the support e.g. applied to supports such as polyolefin fine porous films, wherein it is thought virtually none of the dope is adequately impregnated into the interior, or for fiber-formed two-dimensional sheet supports such as nonwoven fabrics, wherein the dope is adequately impregnated into the interior. EP 1 298 740A also discloses a method involving passing the dope through two opposing dies with a prescribed clearance across the path of conveyance of the JP 10-64503A discloses a separator which is an integrated composite of a nonwoven fabric and an adhesive layer, and a process for its production and describes production of a nonwoven fabric-composited PVdF-based porous film by casting a solution (dope) of PVdF onto a carrier film and then pressing a nonwoven fabric thereover to impregnate the carrier film with the coagulating bath.

A drawback of this approach is that the separators obtained have a poor ionic conductivity. An alternative approach is to use a dope which is a dispersion of a metallic oxide/hydroxide in a solution of the polymer binder to increase the ionic conductivity.

EP 0 232 923A discloses an ion-permeable diaphragm comprising an organic fabric embedded in a film forming mixture of a particulate inorganic hydrophilic material and an organic polymeric binder. EP 0 232 923A further discloses a process of preparing this ion-permeable diaphragm as defined comprising the steps of: i) mixing the particulate inorganic hydrophilic material with a solution of the polymeric binder in an appropriate solvent to form a slurry; ii) uniformly spreading said slurry on an inert flat surface to form a wet sheet; iii) immersing the stretched organic fabric into the wet sheet; iv) removing the solvent by evaporation and/or lixiviation; and v) removing the sheet from the said surface.

WO 93/15529A discloses a method for making a porous membrane with a symmetrical structure which is gas-tight when saturated with electrolyte and whereby, according to this method, a solution is is made from an organic binding agent in a solvent and the solvent is removed by means of extraction through immersion in an organic non-solvent, characterized in that an amount of metal oxide and/or metal hydroxide is added to the solution. WO 93/15529A further discloses a membrane made according to this method and an electrochemical cell containing said membrane between two electrodes preferably characterized in that it is an alkaline cell and in that the membrane is saturated with electrolyte and thus forms a separator between two electrodes. WO 93/15529A exemplifies separators based upon polysulphone as the binder and zirconium oxide or zirconium oxide and zinc oxide as the metal oxide or hydroxide without using reinforcing porous polymer supports. Such non-reinforced separators have been commercialized as ZIRFON° separators and exhibit good wettability, low ionic resistance and a high bubble point, but have a typical asymmetric pore structure with finger-like cavities and took 30 minutes to manufacture all of which is unfavourable.

WO 2006/015462A discloses a process for preparing an ion-permeable web-reinforced separator membrane, comprising the steps of: providing a web and a suitable paste, guiding said web in a vertical position, equally coating both sides of said web with said paste to produce a paste coated web, and applying a symmetrical surface pore formation step and a symmetrical coagulation step to said paste coated web to produce a web-reinforced separator membrane. WO 2006/015462A further discloses a web-reinforced separator membrane, characterised in that the web is positioned in the middle of the membrane and both sides of the membrane have the same pore size characteristics and an apparatus for providing a web-reinforced separator membrane, comprising a web-unwinding station for web-tension control, a spreader roller, a coater with double-side coating with double-sided coating system with automatic paste feeding with vertical (guided) web transportation, and guiding rollers in a heated coagulation bath.

In a poster presented by W. Doyen et al. at the World Hydrogen Technologies Convention, held at Montecatini Terme in Italy between 4th and 7 Nov. 2007, discloses the development of an advanced separator in three thicknesses (250, 550 and 950 µm) and in two temperature versions (80° C. and 120° C.) for use in high temperature alkaline water electrolysis, referred to as the "NEW-ZIRFON® separator. The "NEW-ZIRFON® separator is reinforced with a polypropylene, EFTE or PEEK fabric and exhibits permanent hydrophilicity, good wettability in strongly alkaline solutions, low ionic resistance (0.13 $\Omega \cdot cm^2$ in 6M KOH at 70° C. for the 550 µm thick version), capability of operating at current densities up to 10 $kA/m^2$, no dimensional changes, a tensile strength of at least 25 MPa, a symmetric pore structure, a total porosity between 50 and 55%, a bubble point above 7 bar and a double skinlayer with identical pores at both sides (mean value 0.08 µm) thereby offering a double safety for preventing the mixing of gases. W. Doyen et al. also discloses that the continuous vertical double-sided coating process disclosed in WO 2006/015462A1 is capable of manufacturing 50 cm wide separators. However, the production technology disclosed in WO 2006/015462A1 does not lend itself to large-scale production of ion-permeable web-reinforced separator membranes.

The smoothness of a separator is extremely necessary to ensure optimal performance. Furthermore, it is desirable to develop manufacturing technology capable of large-scale production of ion-permeable web-reinforced separators.

ASPECTS OF THE INVENTION

It is an aspect of the present invention to provide manufacturing technology capable of automation to large-scale production of self-supporting ion-permeable web-reinforced separators with an entirely symmetrical structure and substantially flat surfaces.

It is also aspect of the present invention to provide manufacturing technology capable of reducing the production costs of self-supporting ion-permeable web-reinforced separators with an entirely symmetrical structure and substantially flat surfaces.

It is a further aspect of the present invention to provide manufacturing technology capable of providing very smooth separators as shown by the absence of rings upon visual inspection.

Further aspects and advantages of the present invention will become apparent from the description hereinafter.

SUMMARY OF THE INVENTION

Surprisingly it has been found that self-supporting ion-permeable web-reinforced separators with an entirely symmetrical structure and substantially flat surfaces can be realized without levelling being necessary subsequent to the impregnation step and prior to the phase inversion step. The flatness of the membrane surfaces can be assessed on the basis of the absence or presence of macroscopic cocking or curl.

Aspects of the present invention are realized by an apparatus for producing an ion-permeable web-reinforced separator comprising a duplex type impregnating apparatus [10] comprising two slots each with substantially vertical upper and lower slot faces for providing premetered substantially identical quantities of a dope simultaneously to either side of an elongated porous web, a transport means providing for substantially vertical downwards transport of said elongated porous web through said duplex impregnating apparatus and subsequent phase inversion [11], coagulation [12] and washing stations, said phase inversion station [11] providing for phase inversion of said dope and said coagulation station [12] providing for coagulation and washing of solvent from the resulting phase-inverted dope, wherein there is an air gap between said duplex impregnating apparatus [10] and said phase inversion station [11] and wherein the distance between the lower faces of each impregnating apparatus is greater than the distances between the upper faces of each impregnating apparatus. In the washing station [not shown], residues of the solvent which is not completely washed in the coagulation station, are further removed in the washing station, optionally together with other extractable components from the dope layers.

Aspects of the present invention are also realized by a process comprising the steps of: (i) providing an elongated porous web, said elongated porous web comprising two outermost surfaces; (ii) transporting said elongated porous web downwards between two impregnating heads [6] and [6'] comprising two slots each with substantially vertical upper and lower slot faces substantially parallel to said elongated porous web providing simultaneously to both surfaces of said elongated porous web metered substantially identical quantities of a dope, comprising at least one membrane polymer and at least one solvent therefor; (iii) thereby impregnating said elongated porous web completely with said dope and providing substantially equally thick dope layers on each surface of said outermost surfaces of said elongated porous web with a thickness independent of the gap between one of said lower slot faces and the surface of said elongated porous web nearest thereto; (iv) subjecting said dope associated with said elongated porous web to symmetric phase inversion with at least one non-solvent thereby forming a membrane; and (v) removing residues of said at least one solvent for said at least one membrane polymer from said membrane thereby producing an ion-permeable web-reinforced separator, wherein said dope is shear-thinning and steps (iv) and (v) are optionally performed simultaneously. The term "symmetric phase inversion", as used in the present invention, means that said phase inversion of said dope layer is symmetrical on each surface of said web.

Aspects of the present invention are also realized by an ion-permeable web-reinforced separator obtainable by the above-mentioned process.

Aspects of the present invention are also realized by an electrolytic cell comprising at least one ion-permeable web-reinforced separator as described above.

Aspects of the present invention are also realized by the use of at least one ion-permeable web-reinforced separator as described above in an electrolytic cell.

Further aspects of the present invention are disclosed in the dependent claims.

DETAILED DESCRIPTION

Definitions

The term "dope", as used in disclosing the present invention, means a composition which can be converted into a membrane in at least one subsequent process step.

The term "substantially flat", as used in disclosing the present invention, means having no macroscopic curvature.

The term "substantially free", as used in disclosing the present invention, means less than 10%.

The terms slot and die are used interchangeably in the present text and mean an opening, which depending upon the viscoelastic properties of the dope issuing from the slot during the impregnation process is deposited on the elongated porous web using slot or extrusion coating techniques. Slot and extrusion coating techniques belong to a class of coating method known as premetered coating in which the thickness of the coated liquid layer is in principle set by the flow rate fed to the die, the width of the elongated porous web and the speed of the substrate moving past and is independent of other process variables.

The term "lips of the slot" means, for a slot disposed perpendicular to the transport direction of the fabric, those parts of the impregnation head parallel to the transport direction which are on one or other side of the slot.

Figure 1:
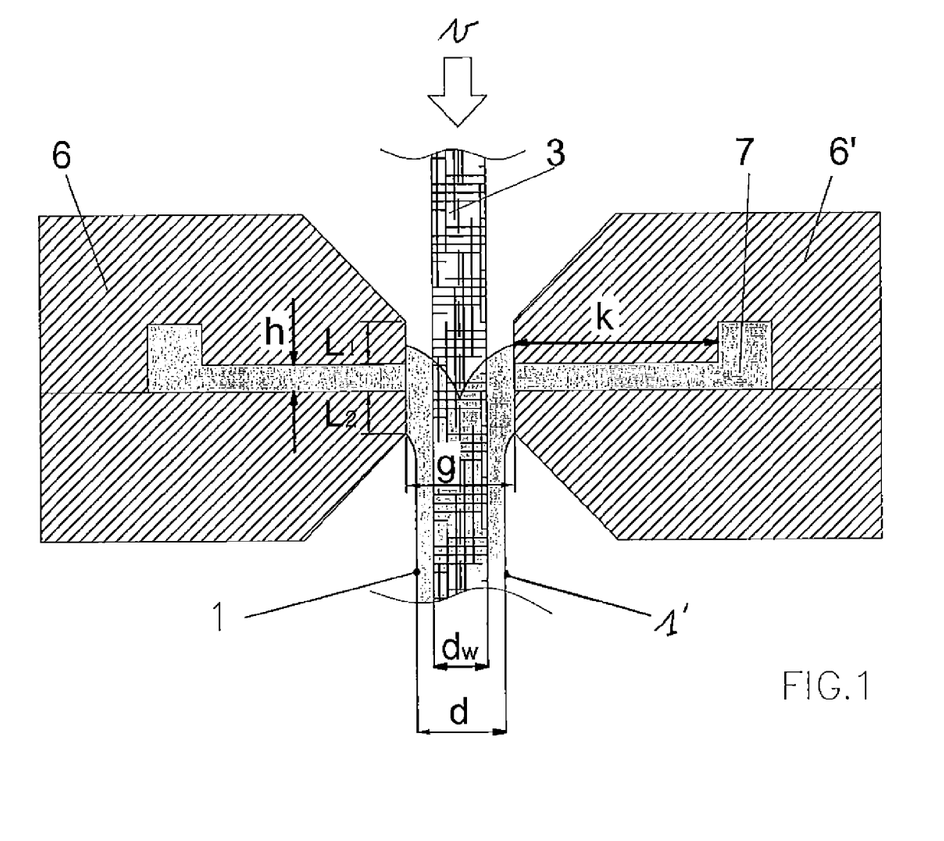
FIG. 1 shows schematically impregnation heads [6] and [6'] providing substantially identical quantities of dope to the elongated porous web.

The term "length of the lips of the slot", as used in disclosing the present invention, means the distance between an edge of the slot perpendicular to the transport direction and the edge of the adjacent part of the impregnation head parallel to the transport direction i.e. "$L_1$" or "$L_2$" in FIG. 1.

The term "slot faces", as used in disclosing the present invention, means the surfaces forming the four sides of the slot opening.

The term "slot opening height", as used in disclosing the present invention, means the average distance between the slot faces perpendicular to the transport direction of the fabric i.e. "h" in FIG. 1.

The term "slot height", as used in disclosing the present invention, means the distance between the slot opening and the manifold connected to the slot i.e. k in FIG. 1.

The term "substantially identical quantities", as used in disclosing the present invention, means deviating by no more than 5%.

The term "substantially vertical", as used in disclosing the present invention, means deviating from the vertical by no more than 10°.

The abbreviation ECFTE represents a copolymer of ethylene and chlorotrifluoroethylene and is known by the tradename HALAR®.

The abbreviation EFTE represents a copolymer of ethylene and tetrafluoroethylene.

APPARATUS FOR PRODUCING AN ION-PERMEABLE WEB-REINFORCED SEPARATOR

Aspects of the present invention are realized by an apparatus for producing an ion-permeable web-reinforced separator comprising a duplex type impregnating apparatus [10] comprising two slots each with substantially vertical upper and lower slot faces for providing premetered substantially identical quantities of a dope simultaneously to either side of an elongated porous web, a transport means providing for substantially vertical downwards transport of said elongated porous web through said duplex impregnating apparatus and subsequent phase inversion [11], coagulation [12] and washing stations, said phase inversion station [11] providing for phase inversion of said dope and said coagulation station [12] providing for coagulation and washing of solvent from the resulting phase-inverted dope, wherein there is an air gap between said duplex impregnating apparatus [10] and said phase inversion station [11] and wherein the distance between the lower slot faces of each impregnating apparatus is greater than the distances between the upper slot faces of each impregnating apparatus and the inset of the lower slot face in respect of the upper slot face is substantially identical for the two slots. In the washing station [not shown], residues of the solvent which is not completely washed in the coagulation station, are further removed in the washing station, optionally together with other extractable components from the dope layers.

The gap between the upper slot faces serves to restrain extreme movement of the elongated porous web and the gap.

According to a first embodiment of the apparatus, according to the present invention, the inset of the lower slot faces in respect of the upper slot faces is in the range of 100 to 300 µm According to a second embodiment of the apparatus, according to the present invention, the elongated porous web is an elongated porous fabric.

According to a third embodiment of the apparatus, according to the present invention, the elongated porous web is a mesh.

According to a fourth embodiment of the apparatus, according to the present invention, the phase inversion station contains a predefined vapour pressure of a phase-inverting medium e.g. water.

Elongated Porous Web

Elongated porous webs for use in the elongated ion-permeable web-reinforced separator, according to the present invention, include elongated porous fabric, porous metal plates and porous ceramic plates.

The elongated porous web is preferably capable of being wound on a winding roller.

The elongated porous web preferably has a thickness of at least 100 μm.

The elongated porous web preferably has a thickness of at most 1000 μm.

Suitable materials for the fabric include polypropylene (PP), polyamide/nylon (PA), polyethersulphone (PES), polyethylene and polyethylene terephthalate (PET), and basalt for low temperature (≤80° C.) applications and polyetheretherketone (PEEK), monochlorotrifluoroethylene (CTFE), copolymers of ethylene and chlorotrifluoroethylene (ETFE), copolymers of ethylene and tetrafluoroethylene (ETFE) and m-aramide for high temperature (≤120° C.) applications. Such fabrics may be woven or non-woven, but are preferably woven. Examples of suitable fabrics are

| | |
|---|---|
| Nitex 03-190/57 | a woven type of web based on polyamide-6.6 filaments supplied by Sefar Inc., Filtration Division, Ruessclikon, Switzerland |
| Colback® CDF 70 | a spunlaid nonwoven web based on polyamide-6 bicomponent filaments (PET core); PA-6 skin), supplied by Colbond Inc. Nonwovens, Enka, North Carolina, USA |
| NL 0510/47PW | a nylon 6 mesh with a plain weaving texture, a mesh opening of 510 μm, an open area of 47%, a warp mesh count of 13.4/cm, a weft mesh count of 13.4/cm, a thread diameter of 235 μm, a thickness of 440 μm and a width of 102 cm from NBC Inc. |
| NL 0525/50PW | a nylon 66 mesh with a plain weaving texture, a mesh opening of 525 μm, an open area of 50%, a warp mesh count of 13.4/cm, a weft mesh count of 13.4/cm, a thread diameter of 220 μm and a width of 102 cm from NBC Inc. |
| PT 0435/47PW | a polyester mesh with a plain weaving texture, a mesh opening of 435 μm, an open area of 47%, a warp mesh count of 16.0/cm, a weft mesh count of 16.0/cm, a thread diameter of 200 μm, a thickness of 400 μm and a width of 102 cm from NBC Inc. |
| PP 0140/38PW | a polypropylene mesh with a PW weaving texture, a mesh opening of 140 μm, an open area of 38%, a warp mesh count of 47.2/cm, a weft mesh count of 40.2/cm, a thread diameter of 87 μm, a thickness of 190 μm and a width of 121 cm from NBC Inc. |
| PP 0445/51PW | a polypropylene mesh with a PW weaving texture, a mesh opening of 445 μm, an open area of 51%, a warp mesh count of 16.5/cm, a weft mesh count of 15.7/cm, a thread diameter of 176 μm, a thickness of 350 μm and a width of 102 cm from NBC Inc. |
| FC 0645/58PW | an EFTE mesh with a plain weaving texture, a mesh opening of 645 μm, an open area of 58%, a warp mesh count of 12.0/cm, a weft mesh count of 12.0/cm, a thread diameter of 200 μm, a thickness of 390 μm and a width of 102 cm from NBC Inc. |
| FC 0360/50PW | an ETFE mesh with a plain weaving texture, a mesh opening of 360 μm, an open area of 50%, a warp mesh count of 20.0/cm, a weft mesh count of 20.0/cm, a thread diameter of 150 μm, a thickness of 310 μm and a width of 102 cm from NBC Inc. |

At a temperature of 150° C. the average crimp of the ETFE-meshes after 45 minutes was 10-15% and that of polypropylene meshes was >30%. At a temperature of 230° C. the average crimp of EFTE-meshes was greater than 30%.

The open area of the elongated porous web is preferably between 30 and 70%, with an open area in the range of 40 to 60% being particularly preferred.

The pores or mesh opening preferably have an average diameter between 100 and 1000 μm, with an average diameter of 300 to 700 μm being particularly preferred.

The elongated porous web is preferably symmetrical with substantially identical pore sizes/mesh sizes on either side of the web.

The elongated porous web is preferably a woven fabric.

The elongated porous web preferably has a MacMullin number in the range 2 to 20 and particularly preferably in the range of 2 to 15. The MacMullin number is an index of ion permeability and it is the value of the conductivity of the electrolyte alone divided by the conductivity with the electrolyte solution impregnated in the support i.e. the ion permeability increases as the number increases.

Process for Producing a Separator

Aspects of the present invention are also realized by a process comprising the steps of: (i) providing an elongated porous web, said elongated porous web comprising two outermost surfaces; (ii) transporting said elongated porous web downwards between two impregnating heads [6] and [6'] comprising two slots each with substantially vertical upper and lower slot faces substantially parallel to said elongated porous web providing simultaneously to both surfaces of said elongated porous web metered substantially identical quantities of a dope, comprising at least one membrane polymer and at least one solvent therefor; (iii) thereby impregnating said elongated porous web completely with said dope and providing substantially equally thick dope layers on each surface of said outermost surfaces of said elongated porous web with a thickness independent of the gap between one of said lower slot faces and the surface of said elongated porous web nearest thereto; (iv) subjecting said dope associated with said elongated porous web to symmetric phase inversion with at least one non-solvent thereby forming a membrane; and (v) removing residues of said at least one solvent for said at least one membrane polymer from said membrane thereby producing an ion-permeable web-reinforced separator, wherein said dope is shear-thinning and steps (iv) and (v) are optionally performed simultaneously. The term "symmetric phase inversion", as used in the present invention, means that said phase inversion of said dope layer is symmetrical on each surface of said web.

This process is clearly distinguished from processes in which the wet-layer thickness is determined by the clearance between the die lip and the web.

In the process, according to the present invention, the lip in the transport direction is completely wetted by the dope and a meniscus is formed between the end of the lower lip and the elongated porous membrane and a self-regulating meniscus between the upper lip and the elongated porous membrane.

The thus obtained elongated separator can be cut to the desired size or if impregnated intermittently the elongated porous web is cut where no dope-impregnation has been carried out.

The positions of the two impregnating heads are variable with the position of the slot faces either side of the slot also being variable in respect to one another e.g. the distance between the upper faces may be smaller than the distance between the lower faces. It has been found that waviness and curl in the separator can be reduced by setting a higher distance between the lower faces of the two impregnating heads than that between the higher faces of the two impregnating heads particularly in the case of thinner elongated porous webs e.g. with thicknesses of 100 μm or 150 μm.

Separator formation is induced from both sides of the doped-impregnated elongated porous web. The displaced air escapes through the mesh in the opposite direction to the transport direction. The separator formation can be split up into two phases: the skin pore formation (outer pores) and bulk pore formation (internal pores). The skin pores are formed by the contact with solvent vapour of solvent 2, a non-solvent of the polymer binder, or solvent 3 (another solvent) a possible carrier vapour, resulting in extraction of the polymer binder solvent, solvent 1, followed by coagulation of the binder polymer. The bulk pores are formed by diffusion from solvent 1, the polymer binder solvent, into solvent 2 through the pores formed from the skin formation step. The extraction of the solvent/solvents in the dope can be realized by contact with vapour [vapour-induced phase separation (VIPS)] and/or liquid [liquid-induced phase separation (LIPS)]. This gives a wide variety of parameter tools for developing the desired composite or complex pore structures. The use of vapour or liquid during the phase inversion process determines the pore size attainable with pore sizes ≤10 μm being obtained with VIPS and pore sizes ≤50 nm being obtained with LIPS. The choice of membrane polymer and pigment also has an influence upon the pore size.

It is known that the structure of such membranes depends on the speed at which the solvent is removed. This speed is clearly different depending on the choice of non-solvent. The influence of the non-solvent on the structure with ultrafiltration membranes is described among others in "Pore Size Control Technique in the Spinning of Polysulfone Hollow Fiber Ultrafiltration Membranes" as appeared in "Desalination", 80 (1991) 167-180 (Elsevier Science Publishers). A solution of polysulphone in N-methyl-pyrrolidone was immersed in various non-solvents, also called coagulants. Hereby it was clear that with water being used as non-solvent, finger-like pores were obtained, whereas when other non-solvents such as ethanol were used for the immersion, but in particular isopropyl alcohol, a fine symmetrical pore structure was obtained. With membranes with finger-like pores, gas-tightness cannot always be guaranteed. With the usual thicknesses of the membrane in for example electrochemical cells, one or more pores can extend crosswise through the membrane. Also when welding the membranes in for example an electrochemical cell structure or when the surface is damaged, gas leaks may occur in membranes made with water as non-solvent. Immersion in an organic non-solvent makes it possible to obtain symmetrical membranes which are gastight when saturated with electrolyte, but the ion conductivity of these membranes is low when they are filled with electrolyte, such that they cannot be applied in electrochemical cells. The structure and ion conductivity of these membranes can be improved by incorporating a metal oxide or metal hydroxide into the dope, as disclosed in WO 93/015529A. The metal oxide or hydroxide is preferably present in a weight ratio with respect to the at least one membrane polymer in the range of 2:1 to 19:1.

The phase inversion agent is one which is a poor solvent for the at least one membrane polymer and include water vapour phase (water vapour or cold steam, preferably at a vapour pressure of 0.02 to 5 bar and particularly preferably at a vapour pressure of 0.05 to 0.2 bar), water and alcohols such as polypropylene glycol, ethylene glycol, tripropylene glycol, 1,3-butanediol, 1,4-butanediol, polyethylene glycol monoethyl ether, methanol, ethanol, propanol, isopropanol, polyhydric alcohols such as glycerine. If a water bath is used as a source of water vapour for the phase inversion, the vapour can be realized by forced convection across the surface of the water bath or by allowing the atmosphere in a closed region above a heated water bath to come into equilibrium with the heated water bath below e.g. overnight. When phase inversion occurs in a water bath, the water should preferably be replaced when the concentration of the solvent removed from the dope in the water reaches 20% by weight.

Alternatively membrane formation is performed by evaporation of the solvent (dry phase inversion). The dope may comprise two solvents in which case the solvent having the lower boiling point is evaporated first and a membrane composition is formed. The solvent with the higher boiling point is trapped in the pores of the membrane composition and is evaporated afterwards.

According to a first embodiment of the process, according to the present invention, the dope further contains an inorganic material. The inorganic material has the effect of increasing the conductivity of the membrane.

According to a second embodiment of the process, according to the present invention, the dope further contains a metal hydroxide or a metal oxide e.g. a zirconium oxide e.g. $ZrO_2$ or a titanium oxide e.g. $TiO_2$.

According to a third embodiment of the process, according to the present invention, the dope further comprises a pore-formation promoting material, preferably in a concentration in the range of 0.2 to 5% by weight with a concentration of 0.5 to 2% by weight being particularly preferred. An example of a pore-formation promoting material is polyvinylpyrrolidone.

According to a fourth embodiment of the process, according to the present invention, the at least one non-solvent is an organic solvent.

According to a fifth embodiment of the process, according to the present invention, the impregnation is performed using extrusion coating techniques. When using extrusion coating techniques, the dope at the impregnation temperature preferably has a viscosity at a shear rate of $1\ s^{-1}$ of greater than $10^3$ mPa·s.

According to a sixth embodiment of the process, according to the present invention, the impregnation is performed using slot coating techniques. When using slot coating techniques, the dope at the impregnation temperature preferably has a viscosity at a shear rate of $1\ s^{-1}$ in the range of 1 to 500 mPa·s.

According to a seventh embodiment of the process, according to the present invention, the impregnation is performed intermittently.

According to an eighth embodiment of the process, according to the present invention, the dope is provided to the elongated porous web in more than one layer with different compositions thereby giving a membrane with an outermost layer with a different composition.

FIG. 1 shows schematically the dope impregnation system in greater detail for impregnation outside the predefined continuous region in which the integrated permeate channel is also filled with dope. v is the transport speed of the 3D spacer fabric, [1] and [1'] are the first and second parts of the 3D spacer fabric and [2] is the space between the first and second parts of the 3D spacer fabric maintained with monofilament spacer threads [3]. [6] and [6'] are the impregnation heads, [7] is the dope, k is the distance between the slot opening and the manifold connected to the slot, h is the average distance between the slot faces perpendicular to the transport direction of the fabric. "g" is the gap between the lower slot faces.

If all the required quantity of dope is deposited without loss then the quantity, Q, in $m^3/s$ supplied by the feed will be completely taken up by the fabric is given by the expression (1):

$$Q = v \times d \times w \quad (1)$$

where the d is the wet layer thickness in m; w is the impregnation (casting) width in m; and v is the transport speed in m/s. In other words it is solely dependent upon the volume/re.

In other words the wet layer thickness d is directly dependent upon the flow rate Q in volume/s and not upon the coating gap=(g−$d_w$)/2 in which a closed meniscus is formed i.e. a liquid bridge.

The distance between the lips of the slots and the elongated porous web is preferably in the range of 0 to 1 mm. The length of the lips of the slots, $L_1$ and $L_2$, are preferably in the range of 0.25 to 25 mm. The slot opening height is preferably in the range of 0.2 to 2 mm. The slot height is preferably in the range of 10 to 100 mm.

According to a ninth embodiment of the process, according to the present invention, the process is a process requiring no manual intervention i.e. is a fully automated continuous process.

According to a tenth embodiment of the process, according to the present invention, the transport speed/process speed of the process is at least 0.5 m/min, with transport speeds in the range of 0.5 to 5 m/min being preferred.

According to a eleventh embodiment of the process, according to the present invention, the liquid dope does not accumulate in a liquid pool space resulting from the positioning of the slot faces relative to the elongated porous web.

Dope

According to a twelfth embodiment of the process, according to the present invention, the dope comprises at least one membrane polymer and at least one organic solvent therefor and optionally further contains and at least one pore formation promoting material.

According to a thirteenth embodiment of the process, according to the present invention, the dope comprises at least one membrane polymer, at least one pore formation promoting material and at least one polar organic solvent and optionally further contains and at least one pore formation promoting material.

According to a fourteenth embodiment of the process, according to the present invention, the dope comprises at least one membrane polymer, at least one polar solvent and at least one stabilizing agent, such as glycerol, and optionally further contains and at least one pore formation promoting material.

Hydrophilizing and stabilizing agents such as polypropylene glycol, ethylene glycol, tripropylene glycol, polyethylene glycol such as PEG 8000 and PEG 20000, glycerol, polyhydric alcohols such as glycerine, dibutyl phthalate (DBP), diethyl phthalate (DEP), diundecyl phthalate (DUP), isononanoic acid, and neo decanoic acid can also be incorporated after the phase-inversion process is completed, but before drying.

Often a variation in solvent mixture will give rise to different film morphologies and hence in membrane performance.

Suitable membrane polymers include polysulphone (PSU), polyvinylidene fluoride (PVDF), poly(acrylonitrile) (PAN), polyethyleneoxide (PEO), polymethylmethacrylate or copolymers thereof. PVDF, VDF-copolymers and organic polymer compounds composed primarily of PVDF are particularly preferred from the standpoint of oxidation/reduction-resistance and film-forming properties. Among these, terpolymers of vinylidene fluoride (VDF), hexafluoropropylene (HFP) and chlorotrifluoroethylene (CTFE) are preferred for their excellent swelling property, heat resistance and adhesion to electrodes.

Suitable pore formation promoting materials include polymers. Suitable hydrophilic polymers include poly(vinyl pyrrolidone) (PVP), crosslinked polyvinylpyrrolidone (PVPP), poly(vinyl alcohol), poly(vinyl acetate), methyl cellulose and polyethylene oxide.

Suitable inorganic materials include $TiO_2$, $HfO_2$, $Al_2O_3$, $ZrO_2$, $Zr_3(PO_4)_4$, $Y_2O_3$, $SiO_2$ perovskite oxide materials, SiC and C(Pt/Rh/Ru), with metal oxides and hydroxides being preferred e.g. a zirconium oxide or a titanium oxide, Inorganic oxides and hydroxides have the additional advantage of increasing the ionic conductivity of the ion-permeable web-reinforced separator.

Suitable polar organic solvents include N-methyl-pyrrolidone (NMP), N-ethyl-pyrrolidone (NEP), N,N-dimethylformamide (DMF), formamide, dimethylsulphoxide (DMSO), N,N-dimethylacetamide (DMAC), acetonitrile and mixtures thereof. Films formed by immersion of a polysulphone-NMP solution in water are porous. However, different membrane structures can be obtained upon immersion of a polysulphone-NMP-THF solution in water.

It has been found that the cockling (waviness) and curl of the ion-permeable web-reinforced separator is largely due to the ion-permeable web-reinforced separator not being entirely symmetric and in particular to the elongated porous web not being positioned centrally in the ion-permeable web-reinforced separator. Setting the distance between the lower lip faces of the impregnation heads greater than that between the higher lip faces can also aid centring of the elongated porous web, particularly in the case of thinner elongated porous webs. The offset between the lower lip faces and the higher lip faces can be 100 μm or more. Increasing the viscosity of the dope also improves the central positioning of the elongated porous web in the ion-permeable web-reinforced separator, but above a critical viscosity this adversely affects the penetration of the elongated porous web by the dope. However, it has also been found that the use of shear-thinning dopes enables the cockling (waviness) of the ion-permeable web-reinforced separator to be reduced without having to use viscosities which adversely affect the dope-penetration of the elongated porous web.

According to a fifteenth embodiment of the process, according to the present invention, the dope preferably has a ratio of viscosity at a shear of 1 $s^{-1}$ to the viscosity at a shear of 100 $s^{-1}$ at the impregnation temperature of at least 2.0, more preferably at least 2.5, most preferably at least 5. Moreover, the higher the viscosity ratio the higher the ratio of total separator thickness to porous web thickness that can be tolerated without prohibitive waviness. Reduced cockling enables more compact electrolytic cells to be realized. The viscosity ratio can be increased by using an inorganic pigment or a polymer as thickener.

It has also been found that the smoothness of the ion-permeable web-reinforced separators is not determined by the dope-viscosity and in principally determined by smoothness of the lower lips of the impregnating heads. Smoothness provides homogeneity in separator properties and avoidance of gas leakage through the separator.

Ion-Permeable Web-Reinforced Separator

Aspects of the present invention are also realized by an ion-permeable web-reinforced separator obtainable by the process according to the present invention.

According to a first embodiment of the ion-permeable web-reinforced separator, according to the present invention, the ion-permeable web-reinforced separator is macroscopically flat at a tensile force of less than 100 N/m. This enables compact stacking in electrolytic cells.

According to a second embodiment of the ion-permeable web-reinforced separator, according to the present invention, the ion-permeable web-reinforced separator has a crimp after 120 minutes at 100° C. of less than 10%, with a crimp of less than 5% being preferred.

According to a third embodiment of the ion-permeable web-reinforced separator, according to the present invention, the ion-permeable web-reinforced separator has a ratio of total thickness to thickness of the elongated porous web of less than 2.1.

The amplitude of the cocking of the ion-permeable web-reinforced separator is preferably at most ten-times the thickness of the elongated porous web.

INDUSTRIAL APPLICATIONS

The ion-permeable web-reinforced separators, according to the present invention, can be used in batteries e.g. in non-aqueous secondary batteries that employ a lithium-containing transition metal oxide as the positive electrode, a lithium dopable/dedopable carbon-based material as the negative electrode and a non-aqueous electrolyte solution as the electrolyte solution (lithium ion secondary batteries); in fuel cells; and in electrolytic or electrochemical cells e.g. in local hydrogen generators in which the hydrogen is produced by the electrolysis of water.

The present invention is illustrated hereinafter by way of COMPARATIVE EXAMPLES and INVENTION EXAMPLES without be limited thereto. The percentages and ratios given in these examples are by weight unless otherwise indicated.

Ingredients:

| | |
|---|---|
| A-100P NT = | A-100P NT, a polyethersulphone (PES) from SOLVAY. |
| K-90 = | Luviscol ® K-90, a poly(vinylpyrrolidone) (PVP) from BASF. |
| 1015/1001 = | Type 1015/1001, a polyvinylidene fluoride (PVDF) from SOLVAY. |
| ACE H827 = | KANE ACE H827, a chlorinated polyvinyl chloride (CPVC) from KANEGAFUCHI K.K. |
| MeCell = | a methyl cellulose from ACROS ORGANICS |
| zirconia-I = | type E101 from MEL-Chemicals, lot nr. 07/215/01M, a zirconium dioxide with an average particle size of 0.658 μm; a specific surface area of 22.26 $m^2$/g; and a pore volume of 0.140 ml/g |
| zirconia-II = | type CS10, a zirconium dioxide with an average particle size of 4.510 μm; a specific surface area of 1.46 $m^2$/g; and a pore volume of 0.05 ml/g |
| zirconia-III = | type E101 from MEL-Chemicals, lot nr. 06/311/01MA |
| zirconia-IV = | type E101 from MEL-Chemicals, lot nr. 07/121/01M |
| titania-I = | type BV07/10 from TRONOX, a titanium dioxide with an average particle size of 1.002 μm; a specific surface area of 4.77 $m^2$/g; and a pore volume of 0.137 ml/g |

Dopes

Dopes 1 to 7 were prepared with the compositions given in Table 1 below:

TABLE 1

| | Dope 1 | Dope 2 | Dope 3 | Dope 4 | Dope 5 | Dope 6 | Dope 7 |
|---|---|---|---|---|---|---|---|
| Zirconia-I [wt %] = | — | 52.6 | — | — | — | — | 49.07 |
| Zirconia-II [wt %] = | — | — | 52.6 | — | — | — | — |
| Zirconia-III [wt %] = | 54.9 | — | — | — | 52.6 | — | — |
| Zirconia-IV [wt %] = | — | — | — | — | — | 52.6 | — |
| Titania-I [wt %] = | — | — | — | 52.6 | — | — | — |
| p-1800 NT 11 (PSF) [wt %] = | 9.70 | 9.3 | 9.3 | 9.3 | 9.3 | 9.3 | 8.66 |
| glycerol [wt %] = | 1.0 | 1.0 | 1.0 | 1.0 | 1.0 | 1.0 | 1.10 |
| N-ethyl pyrrolidone (NEP) [wt %] = | 34.4 | 37.1 | 37.1 | 37.1 | 37.1 | 37.1 | 41.17 |

The polysulphone (P-1800 NT 11) was first dissolved in a mixture of glycerol and N-ethyl pyrrolidone with stirring over 30 minutes followed by adding the inorganic oxide and stirring for a further 120 minutes producing in the case of dope 2 a dispersion with a density of 1.8 g/mL.

The viscosities of dopes 1 to 6 at shear rates of 1 $s^{-1}$ and 100 $s^{-1}$ and were determined at 25° C. using an oscillatory rotary viscometer, the Anton Paar Physica MCR 501, with a CC27 concentric cylinder configuration with a TEZ 150P-C temperature control system at a shear stress of 250 Pa. The results are summarized in Table 2 below:

TABLE 2

| | pigment | Viscosity at 25° C. and a shear rate of 1 $s^{-1}$ [mPa·s] | Viscosity at 25° C. and a shear rate of 100 $s^{-1}$ [mPa·s] | Viscosity ratio |
|---|---|---|---|---|
| Dope 1 | zirconia-III | 398,000 | 22,000 | 18.09 |
| Dope 2 | zirconia-I | 258,968 | 17,392 | 14.89 |
| | | 253,000 | 15,940 | 15.87 |
| | | 246,000 | 16,190 | 15.19 |
| Dope 3 | zirconia-II | 14,600 | 7,740 | 2.1 |
| | | 13,500 | 6,890 | |
| | | 13,700 | 7,110 | |
| Dope 4 | titania-I | 1 × $10^6$ | <$10^5$ | >10 |
| Dope 5 | zirconia-III | 133,000 | 16,400 | 8.11 |
| | | 111,000 | 14,000 | 7.93 |
| Dope 6 | zirconia-IV | 165,967 | 15,735 | 10.55 |
| | | 178,539 | 15,940 | 11.20 |

EXAMPLE 1

Model Experiments

Figure 2:
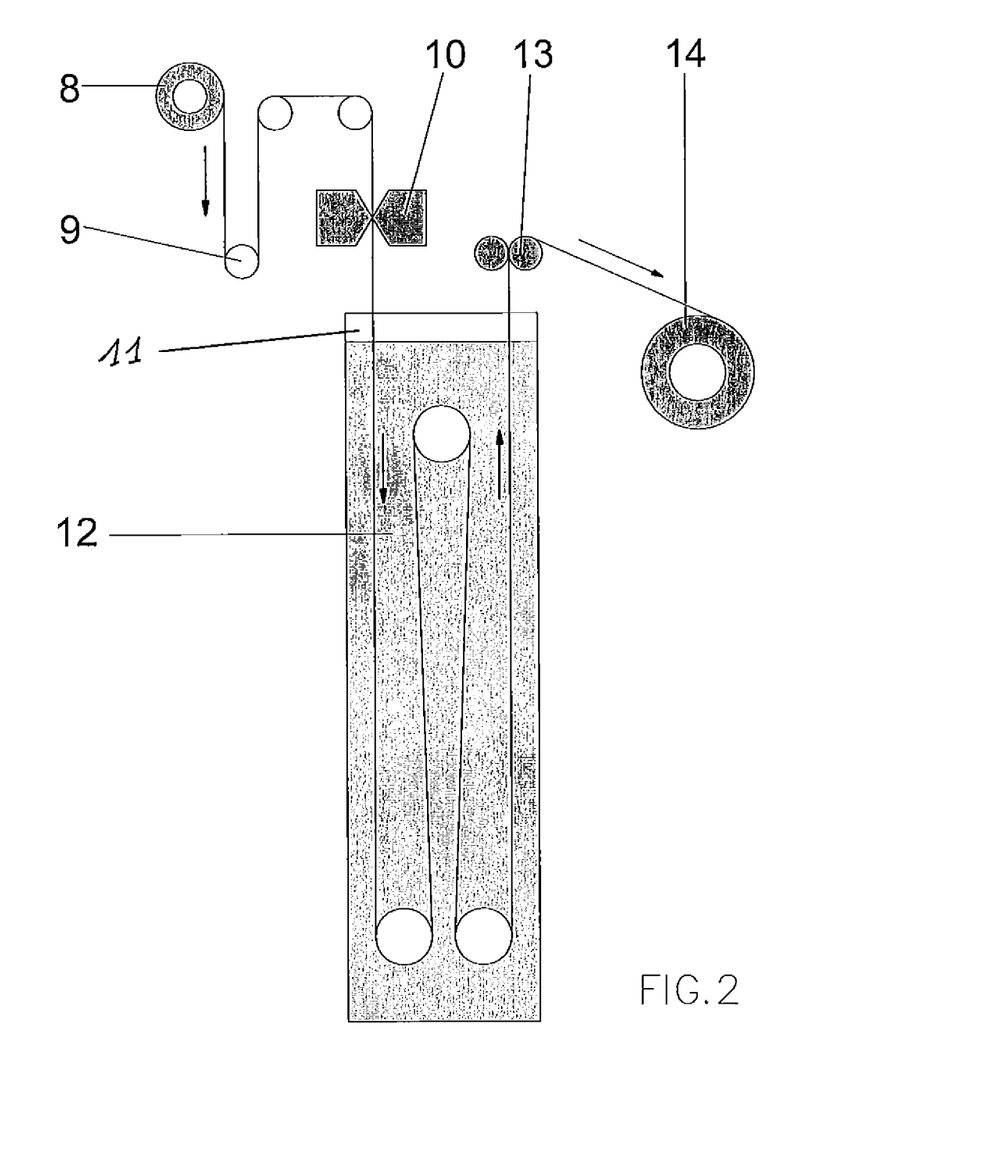
FIG. 2 shows a schematic of a production line for ion-permeable web-reinforced separators, according to the present invention, where [8] is the feed roller, [9] is a compensating roller, [10] is the dope impregnation system, [11] is a vapour phase (cold steam) (for phase inversion), [12] is a immersion bath (for coagulation and optionally washing), [13] is a transport roller and [14] is a winding roller.

Layers of each of dope 2 and dope 7 were separately coated on a non-porous support with wet-layer thicknesses of 100 µm, 500-600 µm and 700-800 µm using the apparatus schematically shown in FIG. 2. The coating speed i.e. the transport speed of the support was 1 m/min and each impregnation head provided 400 mL/m.min of dope at a temperature of 80° C. to each side of the support. Phase inversion was realized by inversion, coagulation and washing by immersion in a water bath at a temperature of 60° C. [5] to remove the solvents N-ethyl-pyrrolidone and glycerol followed by rinsing. Pore sizes in the range of 50 nm to 100 nm were thereby realized.

Finally the resulting porous layers were dried at 40° C. for 60 minutes, the crimp of the resulting unsupported porous layers was evaluated at temperatures of 60° C. and 100° C. in water over periods of 1 to 10 minutes with a control experiment over 110° C. to check whether the crimp in hot water after 10 minutes represented the maximum crimp. The results are summarized in Table 2 below.

TABLE 2

|  | crimp of porous layer obtained with dope 2 [%] | | | crimp of porous layer obtained with dope 7 [%] | | |
|---|---|---|---|---|---|---|
|  | layer thickness | | | | | |
|  | 100 µm | 500-600 µm | 700-800 µm | 100 µm | 500-600 µm | 700-800 µm |
| after 0 minutes at 60° C. | 4.0 | 2.0 | 2.8 | — | — | — |
| after 1 minute at 60° C. | 5.8 | 5.0 | 5.7 | — | — | — |
| after 2 minutes at 60° C. | 6.5 | 5.3 | 6.0 | — | — | — |
| after 3 minutes at 60° C. | 7.0 | 6.2 | 6.8 | — | — | — |
| after 10 minutes at 60° C. | 7.0 | 6.7 | 7.2 | — | — | — |
| after 0 minutes at 100° C. | 4.7 | 3.0 | 2.5 | 4.3 | 2.2 | 3.2 |
| after 1 minute at 100° C. | 7.3 | 6.8 | 6.7 | 6.8 | 5.7 | 6.3 |
| after 2 minutes at 100° C. | 7.5 | 7.3 | 7.2 | 7.0 | 6.2 | 6.7 |
| after 3 minutes at 100° C. | 7.5 | 7.2 | 7.2 | — | — | — |
| after 5 minutes at 100° C. | — | — | — | 7.0 | 6.8 | 7.0 |
| after 10 minutes at 100° C. | 7.5 | 7.3 | 7.5 | 7.0 | 6.7 | 6.8 |
| after 110 minutes at 100° C. | 7.5 | 7.3 | 7.5 | — | — | — |

Three meshes were used in the impregnation experiments; PP 0445/51PW, FC 0645/58PW and FC 0360/50. The crimp of these meshes was evaluated in hot water as a function of time at 100° C. The maximum crimp was attained in each case after about 60 minutes and was 2% for EFTE-meshes and 1% for polypropylene-meshes as shown in Table 3 below;

TABLE 3

|  | Crimp at 100° C. [%] | | | |
|---|---|---|---|---|
|  | after 5 minutes | after 16 minutes | after 60 minutes | after 960 minutes |
| PP 0445/51PW | 0.25 | 0.75 | 1.0 | 1.0 |
| FC 0645/58PW | 0.25 | 0.5 | 1.5 | 1.5 |
| FC 0360/50PW | 0.75 | 0.75 | 1.75 | 2.0 |

The apparatus schematically shown in FIG. 2 was used to apply the dope, 4, simultaneously to either side of the PP 0445/51PW mesh via the impregnation system [10]. The impregnation speed i.e. the transport speed of the 3D spacer fabric was 1 m/min and each impregnation head provided 400 mL/m.min of dope at a temperature of 80° C. to each side of a FC 0360/50PW mesh. Phase inversion was realized by inversion, coagulation and washing by immersion in a water bath at a temperature of 60° C. [5] to remove the solvents N-ethyl-pyrrolidone and glycerol followed by rinsing and drying at 40° C. for 60 minutes. Pore sizes in the range of 50 nm to 100 nm were thereby realized.

The crimp behaviour of the dried membrane was evaluated in hot water at 100° C. for periods in the range of 0 to 120 minutes and the results summarized in Table 4 below.

TABLE 4

|  | crimp of separator at 100° C. [%] |
|---|---|
| after 0 minutes | 0.3 |
| after 1 minute | 2.9 |
| after 2 minutes | 3.0 |
| after 5 minutes | 2.8 |
| after 120 minutes | 3.0 |

EXAMPLE 2

Different porous web-types with different thicknesses were impregnated using different dopes with different viscosity ratios.

The cockling (waviness) of the ion-permeable web-reinforced separator was evaluated on the product of the number of waves per 10 cm and the amplitude of the waves in mm and was awarded an assessment on a numerical scale of 0 to 5 as follows:

| assessment | product of the number of waves per 10 cm and the amplitude of the waves in mm [mm] |
|---|---|
| 0 = | no macroscopically visible waves |
| 1 = | above 0 but <3 |
| 2 = | 3 to <6 |
| 3 = | 6 to <9 |
| 4 = | 9 to <13 |
| 5 = | >13 |

The cocking assessment numbers for separators 1 to 38 are given in Table 5 below.

TABLE 5

| Separator | Dope | viscosity ratio | porous web thickness [μm] | overall thickness [μm] | thickness ratio | cockling assessment number |
|---|---|---|---|---|---|---|
| 1 | 3 | 1.93 | 450 | 700 | 1.56 | 3 |
| 2 | 3 | 1.89 | 300 | 620 | 2.07 | 3 |
| 3 | 3 | 1.89 | 300 | 620 | 2.07 | 3 |
| 4 | 3 | 1.96 | 300 | 620 | 2.07 | 2 |
| 5 | 3 | 1.96 | 300 | 620 | 2.07 | 2 |
| 6 | 3 | 1.93 | 450 | 1050 | 2.33 | 4 |
| 7 | 3 | 1.93 | 450 | 1050 | 2.33 | 5 |
| 8 | 3 | 1.93 | 200 | 500 | 2.50 | 5 |
| 9 | 5 | 7.93 | 350 | 510 | 1.46 | 0 |
| 10 | 5 | 7.93 | 350 | 550 | 1.57 | 0 |
| 11 | 5 | 8.11 | 350 | 550 | 1.57 | 0 |
| 12 | 5 | 7.93 | 150 | 300 | 2.00 | 0 |
| 13 | 5 | 8.11 | 200 | 450 | 2.25 | 5 |
| 14 | 5 | 7.93 | 150 | 600 | 4.00 | 5 |
| 15 | 6 | 11.20 | 350 | 570 | 1.63 | 0 |
| 16 | 6 | 10.55 | 350 | 580 | 1.66 | 0 |
| 17 | 6 | 11.20 | 150 | 260 | 1.73 | 0 |
| 18 | 6 | 10.55 | 350 | 610 | 1.74 | 0 |
| 19 | 6 | 11.20 | 310 | 550 | 1.77 | 0 |
| 20 | 6 | 11.20 | 310 | 550 | 1.77 | 0 |
| 21 | 6 | 11.20 | 310 | 550 | 1.77 | 0 |
| 22 | 6 | 11.20 | 150 | 300 | 2.00 | 0 |
| 23 | 2 | 14.89 | 200 | 250 | 1.25 | 0 |

TABLE 5-continued

| Separator | Dope | viscosity ratio | porous web thickness [μm] | overall thickness [μm] | thickness ratio | cockling assessment number |
|---|---|---|---|---|---|---|
| 24 | 2 | 15.87 | 350 | 520 | 1.49 | 0 |
| 25 | 2 | 15.87 | 350 | 520 | 1.49 | 0 |
| 26 | 2 | 15.87 | 350 | 520 | 1.49 | 0 |
| 27 | 2 | 15.87 | 350 | 520 | 1.49 | 0 |
| 28 | 2 | 14.89 | 350 | 550 | 1.57 | 0 |
| 29 | 2 | 14.89 | 350 | 550 | 1.57 | 0 |
| 30 | 2 | 14.89 | 350 | 550 | 1.57 | 0 |
| 31 | 2 | 14.89 | 350 | 550 | 1.57 | 0 |
| 32 | 2 | 14.89 | 200 | 320 | 1.60 | 0 |
| 33 | 2 | 15.19 | 320 | 550 | 1.72 | 0 |
| 34 | 2 | 15.87 | 300 | 530 | 1.77 | 0 |
| 35 | 2 | 15.87 | 300 | 560 | 1.87 | 0 |
| 36 | 2 | 14.89 | 300 | 560 | 1.87 | 0 |
| 37 | 2 | 14.89 | 200 | 400 | 2.00 | 0 |
| 38 | 1 | 18.09 | 350 | 520 | 1.49 | 0 |

These results show that for a viscosity ratio of ca. 2 all ratios of overall thickness to porous web thickness cannot be impregnated without prohibitive curl, whereas for a viscosity ratio of ca. 8 no curl is obtained for a ratio of overall thickness to porous web thickness of 2, but extreme curl is observed for a ratio of 2.25. For higher viscosity ratios no curl was observed, but the maximum ratio of overall thickness to porous web thickness investigated was 2. This indicates that at viscosity ratios of at least 5.0 no curl was observed for a ratio of overall thickness to porous web thickness of 2 or less.

EXAMPLES 3 to 10

The separators of EXAMPLES 3 to 10 were produced using the apparatus shown in FIG. 2 with different elongated porous webs as indicated in Table 6 with as phase inversion station a water bath at with the surface of the water not being immediately adjacent to the duplex impregnating apparatus with the transport speeds, dope types, dope temperatures, dope viscosity ratios, dope flow rates and water bath temperatures given in Table 6 below.

TABLE 6

| | elongated porous web | | | | | Dope | | | | water |
|---|---|---|---|---|---|---|---|---|---|---|
| Example | type | width [cm] | length [m] | thickness [μm] | transport speed [m/min] | type | viscosity ratio | temperature [° C.] | flow rate [mL/min] | bath temperature [° C.] |
| 3 | PP 0445/51PW | 45 | 20 | 350 | 2 | 6 | 10.55 | 25 | 450 | 25 |
| 4 | FC 0360/50PW | 45 | 50 | 310 | 2 | 6 | 11.20 | 25 | 550 | 25 |
| 5 | FC 0360/50PW | 49 | 15 | 310 | 1 | 2 | 14.89 | 45 | 260 | 25 |
| 6 | PP 0445/51PW | 48.5 | 50 | 350 | 1 | 2 | 15.57 | 60 | 220 | 25 |
| 7 | PP 0445/51PW | 48.5 | 50 | 350 | 1.5 | 6 | 11.69 | 60 | 320 | 25 |
| 8 | PP 0445/51PW | 48.5 | 25 | 350 | 1.5 | 6 | 12.97 | 60 | 320 | 25 |
| 9 | PP 0445/51PW | 48.5 | 25 | 350 | 1.5 | 6 | 12.97 | 60 | 320 | 25 |
| 10 | PP 0140/38PW | 48.5 | 50 | 190 | 1 | 6 | 12.73 | 60 | 245 | 25 |

The characteristics of the separators of EXAMPLES 3 to 10 are summarized in Table 7 below.

TABLE 7

| Example | porous web type | porous web thickness [μm] | overall thickness [μm] | thickness ratio | cockling assessment number |
|---|---|---|---|---|---|
| 3 | PP 0445/51PW | 350 | 591 | 1.69 | 0 |
| 4 | FC 0360/50PW | 310 | 600 | 1.93 | 0 |
| 5 | FC 0360/50PW | 310 | 558 | 1.80 | 0 |
| 6 | PP 0445/51PW | 350 | 517 | 1.48 | 0 |
| 7 | PP 0445/51PW | 350 | 517 | 1.48 | 0 |
| 8 | PP 0445/51PW | 350 | 517 | 1.48 | 0 |

TABLE 7-continued

| Example | porous web type | porous web thickness [μm] | overall thickness [μm] | thickness ratio | cockling assessment number |
|---|---|---|---|---|---|
| 9 | PP 0445/51PW | 350 | 496 | 1.42 | 0 |
| 10 | PP 0140/38PW | 190 | 517 | 1.48 | 0 |

The density of the separators was determined and the separators were subjected to a series of tests. The resistance in the presence of 6M KOH solution was determined. The porosity was determined by comparing the weight of a completely dried piece of the separator with the weight of the same piece of separator saturated overnight with water and is defined as 100×(weight wet−weight dry)/(weight wet). Finally the bubble point was determined by saturating a circular piece of separator; mounting the piece of separator in a metal visual bubble-point test cell with a sintered metal plate with a porous structure for support purposes only immediately above the piece of separator and a metal plate with 0.5 cm holes above the sintered metal plate with water above the metal plate with 0.5 cm holes; and applying a nitrogen or air pressure with increasing pressure in steps of 0.5 bar to the separator piece [see S. Emory, "Principles of Integrity Testing Hydrophilic Microporous Membrane Filters, Part 1", Pharm Technol. 13(9), 68-77 (1989); and S. Emory, "Principles of Integrity Testing Hydrophilic Microporous Membrane is Filters, Part 1I", Pharm Technol. 13(10), 36-46 (1989)]. The bubble point is the pressure at which a bubble of nitrogen or air is first observed with a high pressure indicating a very small pore size. These results are summarized in Table 8 below.

TABLE 8

| Example | density [g/mL] | resistance in the presence of 6M KOH at 30° C. [Ωcm] | porosity [%] | Bubble point [bar] |
|---|---|---|---|---|
| 3 | 1.28 | 3.75 | 51.8 | 8.90 |
| 4 | 1.47 | 3.98 | 51 | >10 |
| 5 | 1.4 | 3.75 | 50 | — |
| 6 | 1.28 | 4.12 | 47.8 | 8.83 |
| 7 | 1.28 | 4.12 | 47.8 | 8.83 |
| 8 | 1.27 | 3.99 | 46.2 | 9.67 |
| 9 | 1.27 | 3.99 | 46.2 | 9.67 |
| 10 | 1.36 | 4.03 | 50.0 | >10 |

These results show that acceptable resistances, porosity and bubble point values for separator applications are realized with the separators of EXAMPLES 3 to 10.

Having described in detail the current invention, it will now be apparent to those skilled in the art that numerous modifications can be made therein without departing from the scope of the invention as defined in the appending claims.

The invention claimed is:

1. A process comprising the steps of:
   (i) providing an elongated porous web, said elongated porous web comprising two outermost surfaces;
   (ii) transporting said elongated porous web downwards between two impregnating heads comprising two slots each with upper and lower slot faces, said faces having a vertical orientation or an orientation which deviates from vertical by no more than 10°, parallel to said elongated porous web providing simultaneously to both surfaces of said elongated porous web metered quantities of a dope, said quantities on both surfaces being identical or deviating from identical by no more than 5%, comprising at least one membrane polymer and at least one solvent therefor;
   (iii) impregnating said elongated porous web completely with said dope and providing dope layers on each surface of said outermost surfaces of said elongated porous web with an equal thickness or a thickness which may deviate from equal by no more than 5%, said thickness being independent of the gap between one of said lower slot faces and the surface of said elongated porous web nearest thereto;
   (iv) subjecting said dope associated with said elongated porous web to phase inversion with at least one non-solvent, wherein said phase inversion of said dope layer is symmetrical on each surface of said web, thereby forming a membrane; and
   (v) removing residues of said at least one solvent for said at least one membrane polymer from said membrane thereby producing an ion-permeable web-reinforced separator, wherein said dope at the impregnation temperature has a ratio of viscosity at a shear of $1\ s^{-1}$ to the viscosity at a shear of $100\ s^{-1}$ of at least 2.5;
   wherein step (iii) is performed in an impregnating apparatus and step (iv) in a phase inversion station and wherein there is an air gap between said impregnating apparatus and said phase inversion station.

2. The process according to claim 1, wherein said steps (iv) and (v) are performed simultaneously.

3. The process according to claim 1, wherein said ratio of viscosity at a shear of $1\ s^{-1}$ to the viscosity at a shear of $100\ s^{-1}$ is at least 5.

4. The process according to claim 1, wherein the distance between the upper faces is smaller than the distance between the lower faces.

5. The process according to claim 1, wherein the offset between the lower faces and the upper faces is 100 μm or more.

6. The process according to claim 1, wherein the ratio of total thickness to thickness of the elongated porous web is less than 2.1.

7. The process according to claim 1, wherein said dope further contains an inorganic material.

8. The process according to claim 7, wherein said inorganic material is a metal hydroxide or a metal oxide.

9. The process according to claim 1, wherein said at least one non-solvent is an organic solvent.

10. The process according to claim 1, wherein said impregnation is performed using extrusion coating.

11. The process according to claim 1, wherein said impregnation is performed using slot coating.

12. The process according to claim 1, wherein said impregnation is performed intermittently.

* * * * *